United States Patent [19]

Budai

[11] 4,242,707
[45] Dec. 30, 1980

[54] DIGITAL SCENE STORAGE
[75] Inventor: Karoly Budai, Dix Hills, N.Y.
[73] Assignee: Chyron Corporation, Plainview, N.Y.
[21] Appl. No.: 936,021
[22] Filed: Aug. 23, 1978
[51] Int. Cl.³ .............................................. H04N 1/38
[52] U.S. Cl. .................................. 358/280; 328/151;
 358/93; 358/160
[58] Field of Search ...................... 358/83, 93, 96, 160,
 358/256, 280; 340/729, 744, 750, 753, 754, 793;
 328/151

[56] References Cited
U.S. PATENT DOCUMENTS

| | | | |
|---|---|---|---|
| 2,992,293 | 7/1961 | Cameron et al. | 358/96 |
| 3,654,562 | 4/1972 | Reilly, Jr. et al. | 328/151 |
| 3,728,481 | 4/1973 | Froelich et al. | 358/96 |
| 3,863,023 | 1/1975 | Schmersal et al. | 358/160 |
| 3,963,866 | 6/1976 | Tanie | 358/96 |
| 3,979,555 | 9/1976 | Opitter et al. | 358/160 |
| 4,075,658 | 2/1978 | de Cosnac et al. | 358/96 |

FOREIGN PATENT DOCUMENTS 2268416 11/1975 France ........................................ 358/96

Primary Examiner—Benedict V. Safourek
Assistant Examiner—Joseph A. Orsino, Jr.
Attorney, Agent, or Firm—Hane, Roberts, Spiecens & Cohen

[57] ABSTRACT

A scene which is divided into a plurality of pixels is raster scanned. During each scan an analog signal derived from a binary number and representing a given light intensity is compared against other analog signals representing the light intensity of each of the pixels. At any time when the light intensity of a pixel is greater than the given light intensity, the binary number associated with that given light intensity is stored in a register of a multiregister memory whose registers are assigned to the respective pixels. After each scan the given light intensity is increased.

2 Claims, 3 Drawing Figures

SCENE DIGITIZER SD

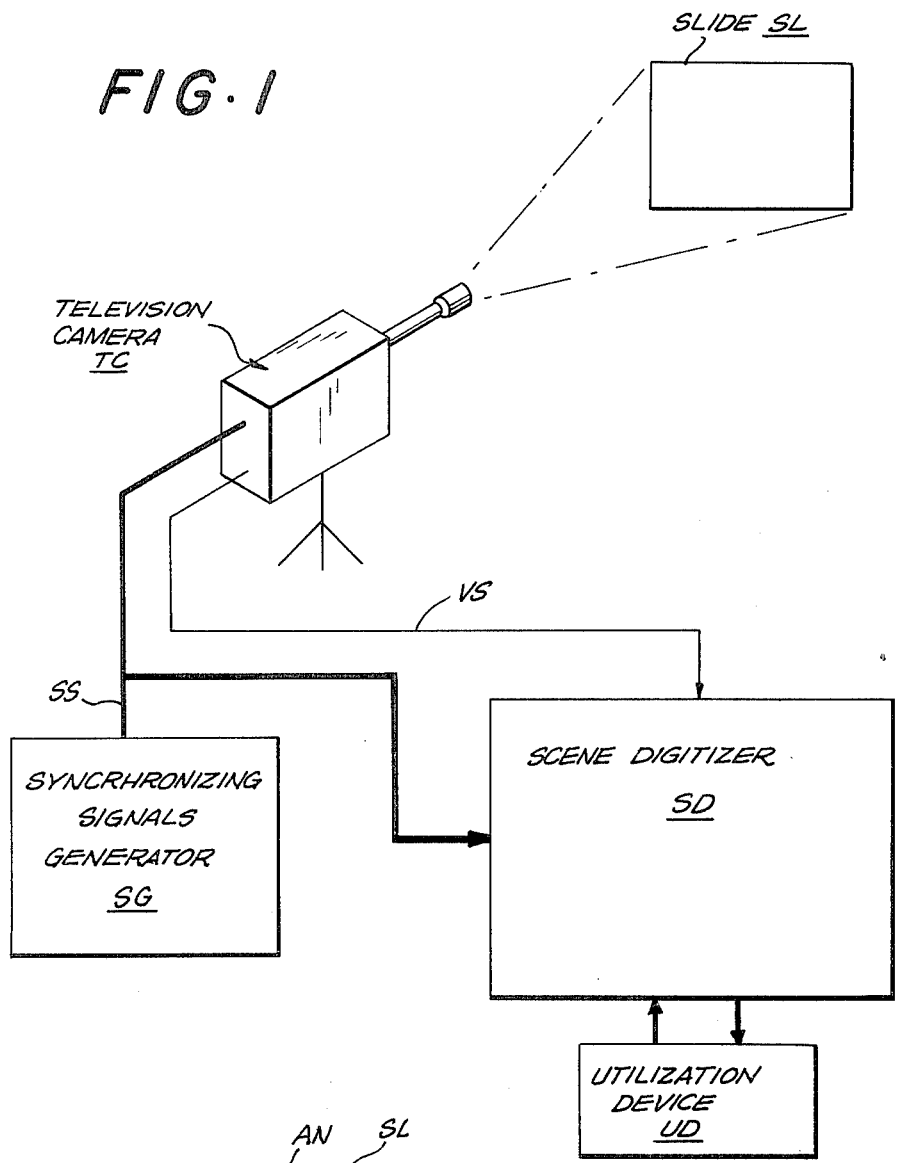
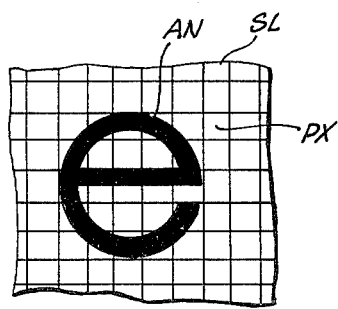

DIGITAL SCENE STORAGE

BACKGROUND OF THE INVENTION

This invention pertains to the digital storage of analog information and more particularly to the digital storage of scenes in pulse coded modulated form.

In the visual arts and in particular in television or photocomposing, it is quite common to store characters, symbols, figures and the like for later transmission or printing. In many cases using television raster scanned type character generators and graphic terminals because of the grid array of the pixels and the on-off nature of the radiation beam, curved edges and edges making acute angles with the raster are jagged.

It has been found that if one amplitude modulates the intensity of the beam instead of turning it on and off, it is possible to minimize such jaggedness.

In general, the fonts of characters, symbols, etc. for the character generators are sets of digital information stored in a digital type memory. The digital information is either generated by manual techniques or by using television camera scanning of pictures or slides. Heretofore, the scanning techniques used purely binary criteria, i.e., the reflected light from a pixel of a scene was either above or below a certain value. If it were above such value a "one" or "on" was recorded in a memory cell associated with such pixel. If it was below that value a "zero" or "off" were stored. However, it was just this technique which resulted in the above-mentioned jaggedness. Thus people proposed PCM-techniques where the amplitude of the light intensity was encoded into, say, a four-bit binary number, i.e., the amplitude is quantized into sixteen levels. It is apparent that during the encoding of the information one need only feed the output of the television camera scanning the scene to an analog to digital encoder. However, because of the scanning rates, the time to perform each digital-to-analog conversion becomes extremely short. Present day digital to analog converters either cannot operate at such rates or those that can are prohibitively expensive.

SUMMARY OF THE INVENTION

It is accordingly an object of the present invention to provide an improved method and apparatus to generate and store digital representation of a scene or the like.

Briefly, the invention contemplates storing the digital representation of a scene by dividing the scene into pixels and providing a memory with a plurality of storage locations, each assigned to a specific pixel. The pixels are repeatedly scanned and for each such scan there is established a different given radiation characteristic such as light intensity. During each scan the so established radiation characteristic is compared sequentially with the actual radiation characteristic of each pixel and there is stored in a related storage location a digital representation of the thus established radiation characteristic of each pixel whose actual radiation characteristic has a particular relationship, such as being greater, with the established radiation characteristic. After each scan the given amplitude of the radiation characteristic is monotonically changed, for example, increased.

BRIEF DESCRIPTION OF THE DRAWING

Other objects, the features and advantages of the invention will be apparent from the following detailed description when read with the accompanying drawing which shows by way of example and not limitation apparatus for realizing the invention. In the drawing:

FIG. 1 is a block diagram of a system for storing digital information about a scene in accordance with the invention;

FIG. 2 shows a portion of the scene of FIG. 1; and

DESCRIPTION OF THE PREFERRED EMBODIMENT

Figure 3:
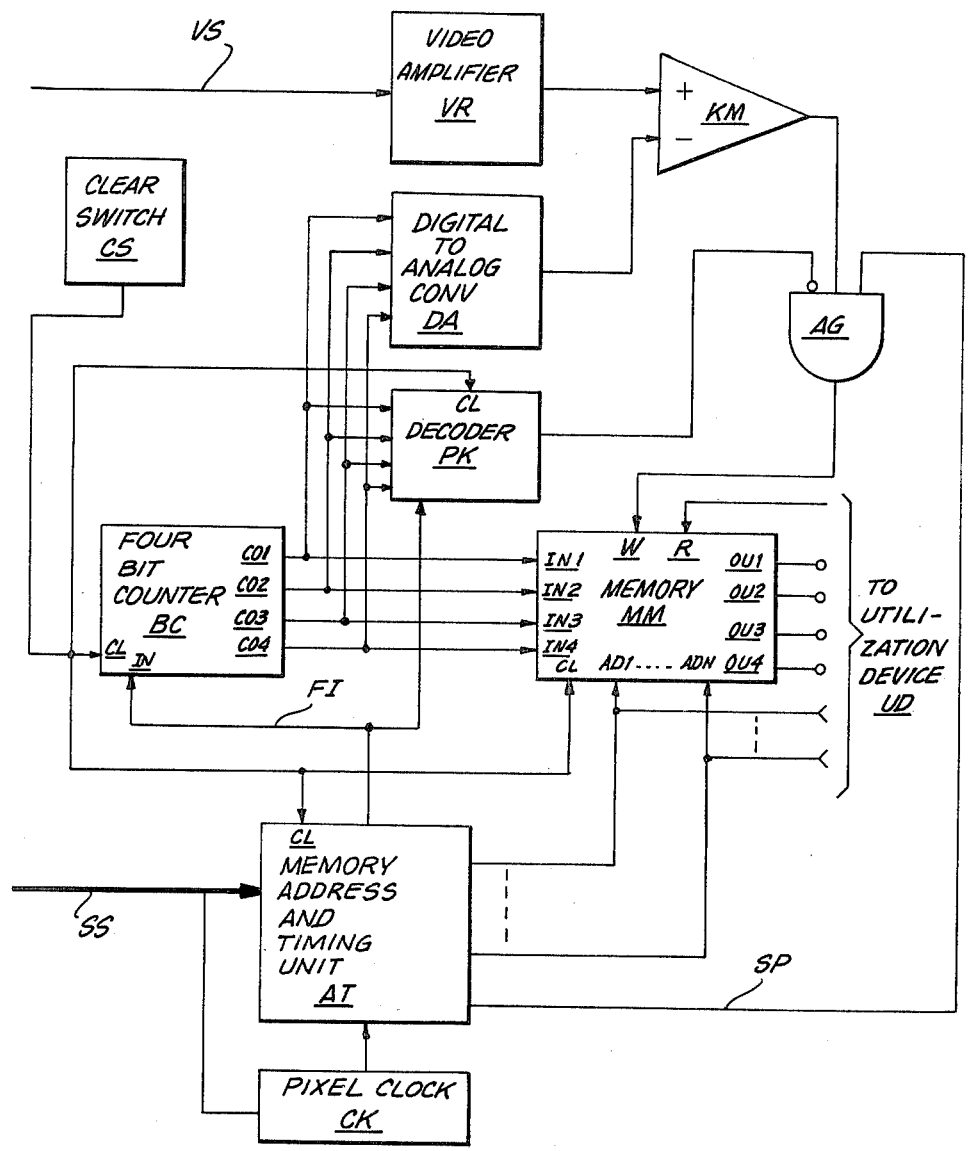
FIG. 3 is a logic diagram of the scene digitizer of FIG. 1.

In FIG. 1 there is shown a system for digitizing the scene show on slide SL comprising the television camera TC focussed on slide SL and driven to scan the slide by means of synchronizing signals on the lines of cable SS from synchronizing signals generator SG. The television camera TC emits an analog signal whose instantaneous amplitude is a function of the region (pixel) of the scene then being scanned. This signal is fed via line VS to the scene digitizer SD which with the aid of the synchronizing signals on lines of cable SS digitizes the analog signal and stores the digital or PCM values in storage locations of a memory for later use by the utilization device UD.

The slide SL can carry whatever scene one wishes to digitize. One common scene is an alphanumeric or symbol which is used in building up a font for later use by a character generator. Any scene can be used provided it is fixed, i.e., is not moving. A portion of a typical scene for font generation is shown in FIG. 2 wherein an alphanumeric AN is recorded in black against a white background. The lines of the grid are present merely to convey the idea of pixels. A typical pixel PX is a picture element defined by a given length of a horizontal scan line of the raster. Thus, one can divide the scene into a set of pixels by taking samples at fixed time intervals during each horizontal scan line of a conventional television raster.

In particular, television camera TC which is focussed on slide SL is driven by horizontal sync pulses, vertical sync pulses and blanking pulses on lines of the cable SS to scan the slide SL in the usual interlaced television raster. The television camera TC can be an image orthicon of the like whose scan is synchronized in the usual manner by the above-mentioned synchronizing signals.

The synchronizing signals generator SG generates in the usual manner the horizontal sync pulses, the vertical sync pulses, the blanking pulses and the odd/even field pulses.

The scene digitizer SD includes a memory with a plurality of multibit registers which are addressable (four-bit registers will be assumed). In fact the registers are in one to one correspondence with the pixels of the slide. This correspondence is obtained by using the horizontal and vertical sync pulses to generate say the row addresses of the memory and using a clock to generate the column addresses of the memory wherein the clock has a period equal to the time required for the camera to traverse the given length of a horizontal scan line, i.e., pixel length. Included in the scene digitizer SD is means for generating a reference analog signal whose amplitude is increased by a given increment for each frame of the scan. For example, if one wishes to quantize the range between zero percent intensity or black and full intensity or white into sixteen generalized levels (gray levels) then the amplitude of the generated analog signal is increased from zero amplitude by a 6.25% increment of full amplitude each frame for sixteen frames up to the full amplitude. During each frame the reference analog signal is compared against the analog signal on line VS representing the light intensity of the sequentially scanned picture elements. Whenever, the amplitude of the analog signal on line VS exceeds the amplitude of the reference analog signal, there is recorded in the register associated with the then being scanned pixel a four-bit binary number representing the quantized level then being generated.

In particular, at the start of operation, the minimum amplitude reference signal is generated. Associated with this level is the binary number 0000. During the frame the pixels are scanned. Since no level from the slide can be less, each register will store the number 0000. During the next frame the amplitude of the reference signal will be 6.25% of full amplitude and have associated therewith the binary number 0001. During the scan of this frame whenever the amplitude of the video signal on line VS exceeds this 6.25% level, there will be recorded in the register of the associated pixel the number 0001. For those that are below the stored number remains unchanged at 0000. This procedure of an 6.25% incrementing the amplitude of the reference signal for each successive frame and for simultaneously incrementing the four-bit binary number continues for the sixteen frames. It should be noted that the only time the contents of a register are changed is when the amplitude of the analog signal on line VS is greater than the amplitude of the reference signal. Note the whole process could be reversed, i.e., starting with white and decrementing.

The scene digitizer SD of FIG. 3 will now be described. The digitizer SD centers around memory MM which can be a random access memory having a plurality of four-bit registers wherein each register is assigned to a particular pixel. It is convenient to array the registers such that the rows of registers are in correspondence with the horizontal raster line and the columns with the pixels in the lines. The memory MM has four input terminals IN1 to IN4 and four output terminals OU1 to OU4 for receiving and transmitting respectively a four-bit word with the bits in parallel. The memory MM has a plurality of address terminals AD1 to ADN which receive signals for selecting a register. The memory has a write terminal W which when energized will cause the recording of the binary word then present on the input terminals in the register selected by the signals present on the address terminals. The read terminal R when energized causes the transfer to terminals OU1 to OU4 of the contents of the register addressed by the signals present on terminals AD1 to ADN. The registers of the memory are cleared when a signal is received at input CL.

The memory address and timing unit AT includes a counter which counts horizontal sync pulses and is initialized by the vertical sync pulses or vertical blanking pulses to generate the row address signals. It also includes a counter for counting pulses from pixel clock CK synchronized to the regular sync signals and is initialized by the horizontal sync or horizontal blanking pulses to generate the column address signals. Unit AT also includes a circuit which converts the odd/even field signals to one pulse per frame which is emitted on line FI to four bit counter BC.

Counter BC is a conventional four stage binary counter which is cleared to 0000 in response to a signal received at its input CL and which is unit incremented each time a pulse is received at input IN. The outputs of the respective stages are connected to terminals CO1 to CO4 which are connected to the input terminals of memory MM, the input terminals of decoder DK (a conventional decoder which emits a pulse when all inputs are high for a count of 1111 or 15 to set a flip-flop therein), and the inputs of digital to analog converter DA. Converter DA can be a conventional device which converts one of the sixteen possible binary numbers at its inputs to an analog signal having one of sixteen amplitudes. The output of the converter DA is connected to the (−) input of comparator KM.

Comparator KM can be a conventional high speed difference amplifier which emits a signal ("goes high") whenever the signal at its (+) input is greater in amplitude than the signal at its (−) input. The (+) input of the comparator KM is connected via video amplifier VR to line VS which receives the analog signal from the television camera TC.

The output of the comparator KM is connected to one input of three-input AND-circuit AG having an inhibiting input connected to the output of decoder DK and a sampling input connected to line SP from unit AT to limit sampling to once per pixel. The output of AND-circuit AG is connected to the write input W of memory WR.

Operation during a representative one of the 16 frames assumed will now be described. Assume the counter stores a count equal to 1100 representing the 75% intensity level. During the entire scanning of the frame the number is fed from outputs CO1 to CO4. As the video signal (analog signal of the pixels) is fed to the (+) input of comparator KM its amplitude is compared against the amplitude of the reference signal generated by digital to analog converter DA is response to the receipt of binary number 1100 at its inputs. As long as the amplitude of the video signal is less than that of the reference signal the output of comparator KM is low and all samplings of AND-circuit AG are blocked. When the amplitude of the video signal is greater than the amplitude of the reference signal the output of the comparator KM goes high. As long as the output remains high each sampling pulse on line SP results in the transmission of a pulse to the write input W. Thus the register then being addressed is loaded with the binary number 1100. In this case all pixels having intensity amplitudes greater than 75% of white are loaded with the binary number 1100. At the end of the frame, a pulse on line FI increments the count in the counter BC to 1101 associated with the 81.25% level. During this new frame the scanning is again performed as before but with these new values.

The next pulse on line FI after the count of 1111 set decoder DK which now blocks AND-circuit AG ending the encoding of the scene.

When a new scene is to be encoded the clear switch CS initializes the counter BC, clears the registers of the memory MM, initializes the counter in unit AT and resets the decoder DK. Whenever the stored information is desired, read signals and address signals are fed from utilization device UD such as a font memory and the contents of memory MM are fed thereto via terminals OU1 to OU4.

While only one embodiment of the invention has been shown and described in detail there will now be obvious to those skilled in the art many modifications and variations satisfying many or all of the objects of the invention without departing from the spirit thereof as defined by the appended claims.

What is claimed is:

1. Apparatus for storing the representation of a scene comprising: scanning means for repetitively raster scanning and emitting a first analog signal whose amplitude represents the light intensity reflected from each pixel of the scene; memory means having a plurality of storage locations, each of said storage locations being assigned to a particular pixel of the scene, and having a plurality of data inputs and a write control input; signal amplitude generating means comprising a scan by scan incremented counter means having outputs connected to said data inputs and a digital to analog converter means connected to the outputs of said counter means for generating a second analog signal representing a light intensity; and analog signal comparator having first and second inputs for receiving the first and second analog signals respectively and an output means connected to said write control input means for emitting a signal thereto for recording in the associated storage location a representation of the amplitude of the second analog signal only when the amplitude of the first analog signal has a particular relationship with the amplitude of the second analog signal.

2. Apparatus for storing the representation of a scene comprising: scanning means, said scanning means comprising a television camera, synchronizing signal generating means for generating synchronizing signals for driving the television camera to perform repetitive parallel line raster scans of the scene, and means for emitting a first analog signal whose amplitude represents the light intensity reflected from each pixel of the scene; a memory means, said memory means having a plurality of storage locations which are selected with the aid of the synchronizing signals, each of said storage locations being assigned a particular pixel of the scene, a plurality of data inputs and a write control input; signal amplitude generating means comprising a scan by scan incremented counter means having outputs and a digital to analog converter means connected to the outputs of said counter means for generating a second analog signal having an amplitude representing a light intensity; means for connecting the outputs of said counter means to the data inputs of said memory means; and recording means comprising an analog comparator means having first and second inputs for receiving the first and second analog signals respectively and an output connected to the write control input of said memory means for emitting a write signal only when the amplitude of the first analog signal has a particular relationship with the amplitude of the second analog signal.

* * * * *